United States Patent [19]

Roe et al.

[11] 4,056,235

[45] Nov. 1, 1977

[54] BEZEL CASE

[75] Inventors: Alfred W. Roe, Bellport, N.Y.; John Ogden, Rayleigh, England; Robert Carter, Shoreham, N.Y.

[73] Assignee: Roe International, Inc., Patchogue, N.Y.

[21] Appl. No.: 743,524

[22] Filed: Nov. 19, 1976

[51] Int. Cl.$^2$ .......................... B65D 11/10; G01B 3/08
[52] U.S. Cl. ..................................... 220/4 E; 33/138; 220/1 A; 242/84.8
[58] Field of Search ...................... 242/84.8, 96, 55.53, 242/99; 33/138; 220/1 A, 4 B, 4 E

[56] References Cited

U.S. PATENT DOCUMENTS

| | | | |
|---|---|---|---|
| 1,638,227 | 8/1927 | Witchger | 220/1 A |
| 2,722,173 | 11/1955 | Cunningham | 220/4 B |
| 3,381,916 | 5/1968 | Edgell | 242/99 X |
| 3,482,798 | 12/1969 | Kawaguchi | 242/99 X |
| 3,686,767 | 8/1972 | Duda et al. | 242/84.8 |

*Primary Examiner*—George F. Mautz
*Attorney, Agent, or Firm*—Harold L. Stults

[57] ABSTRACT

A tape reel case, for containing a flexible metal tape measure or the like, includes a pair of substantially identical case elements or bezels, each of which consists of a peripheral wall having first and second edge portions and an inwardly extending wall portion integral with the second edge portion of the peripheral wall. The first edge portion of the peripheral wall has a tape discharge slot of predetermined length formed therein extending from its first edge portion toward the second edge portion thereof. This first edge portion of the wall also has a groove formed therein extending from a first end adjacent one end of the slot through approximately one half of the peripheral length of the wall to a second end portion approximately diametrically opposed from the slot. In addition the first edge portion of the peripheral wall has a bead formed therein extending from a first end portion adjacent the opposite end of the slot from the first end portion of the groove through approximately one half of the peripheral length of the peripheral wall to a second end portion approximately diametrically opposite said slot, adjacent to but slightly spaced from the second end portion of the groove so that the groove and bead of the case elements mate with each other when the case elements are placed in superimposed relation to each other whereby the groove and bead on the superimposed first edge portions of the bezels can be sonically welded together.

18 Claims, 9 Drawing Figures

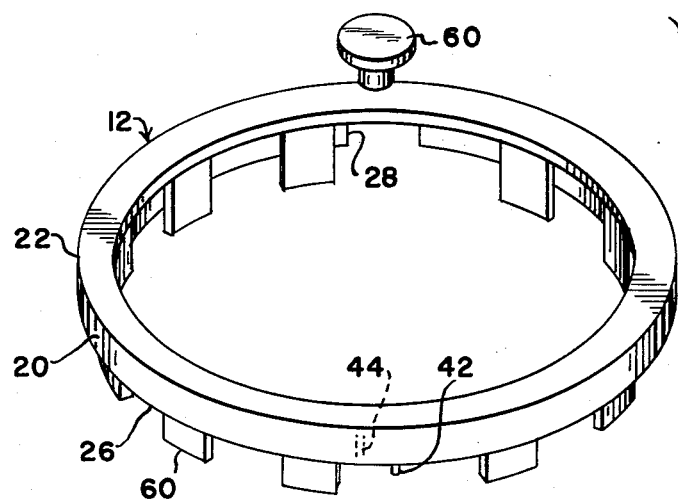
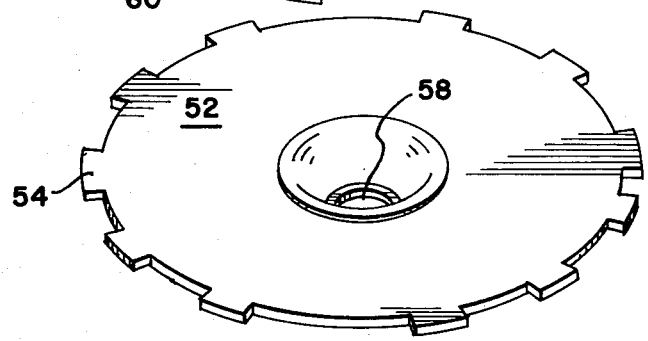
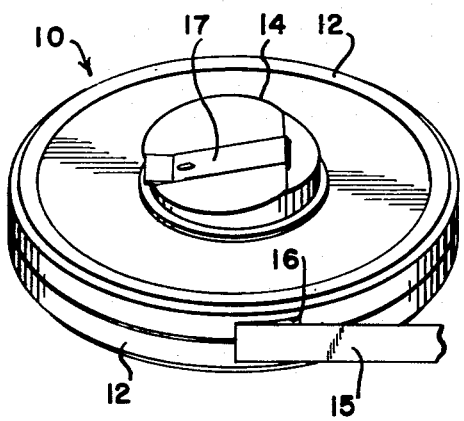
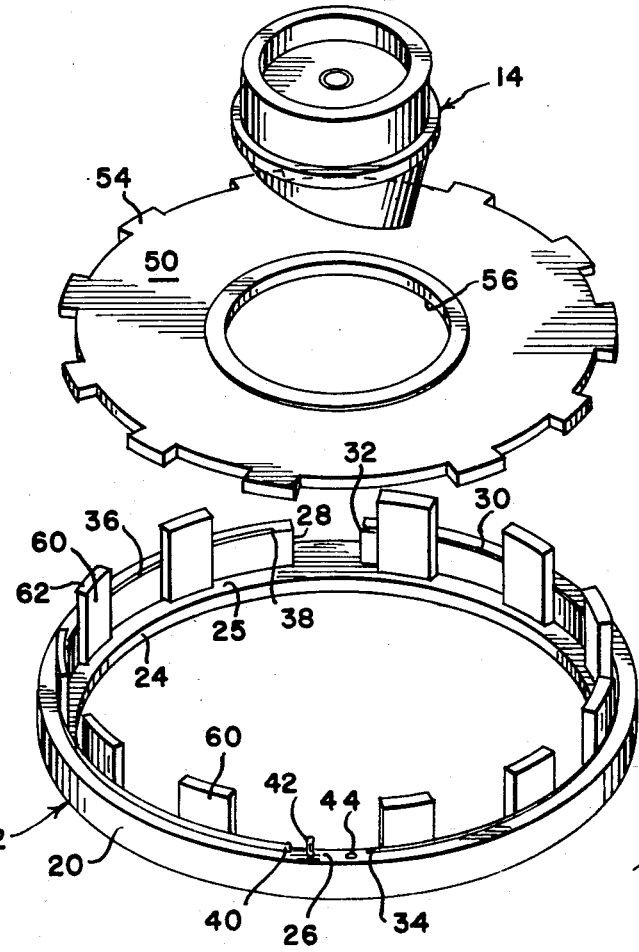

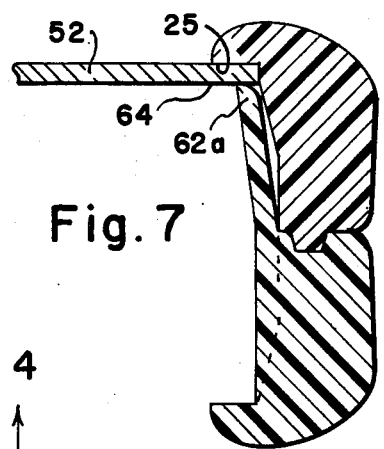
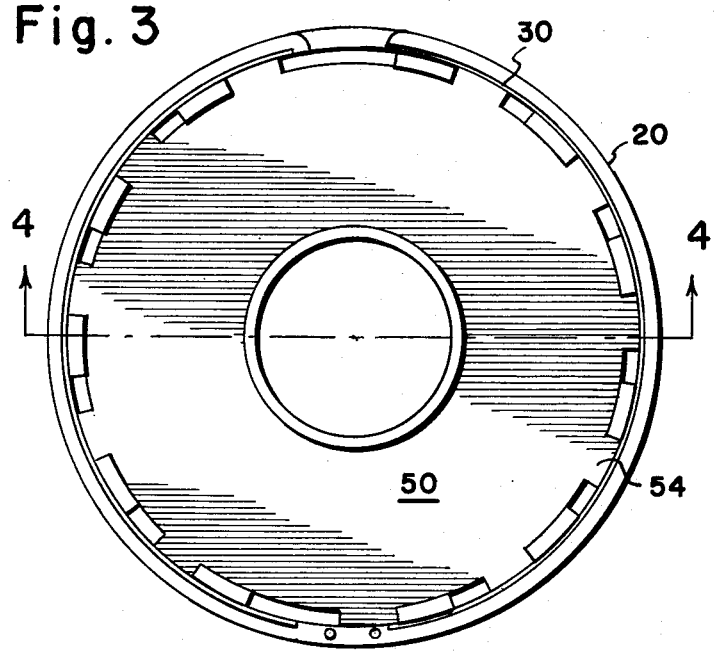
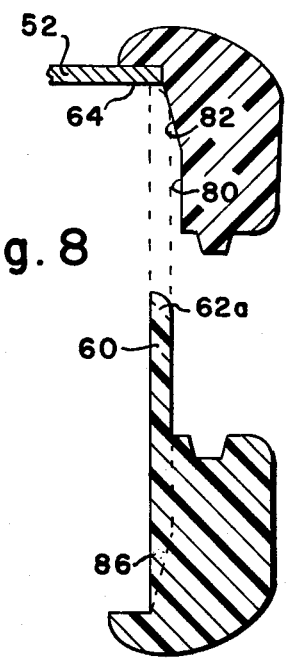
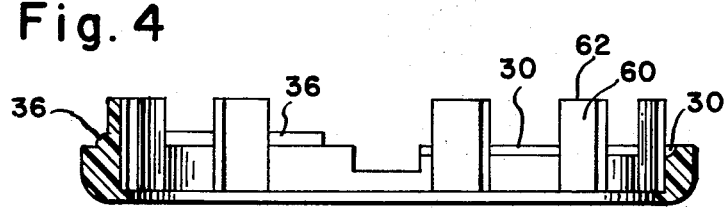
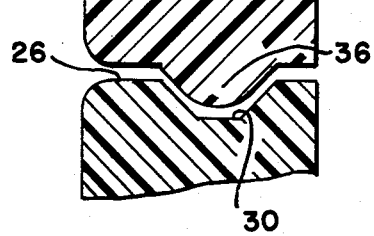
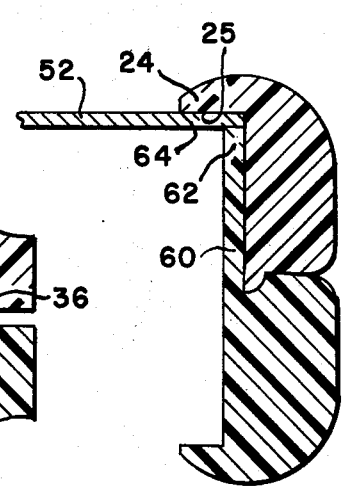
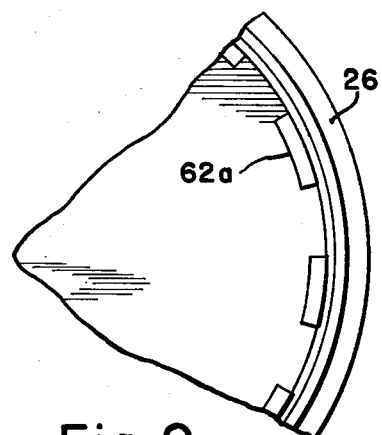

BEZEL CASE

The present invention relates generally to flexible tape measure cases, and more particularly to tape measure cases of the type in which a flexible steel tape or rule is wound on a reel mounted for rotation within a casing to dispense and rewind the tape.

Tape measure cases have been previously provided in a variety of types of configuration. Such cases have heretofore been formed of molded plastic and/or metal components, secured together typically by means of a series of screws extending through the peripheral edges of the cases. While many of the previously proposed tape cases have been found to be satisfactory in use, they are often relatively complex in construction and difficult to manufacture. Typically the previously proposed cases require a multiplicity of different parts, and at least two different opposed side case members.

It is an object of the present invention to provide a tape reel case which is formed of a minimal number of parts.

Another object of the present invention is to form a tape reel case having a pair of duplicate members to form the completed case.

A still further object of the present invention is to provide a tape reel case which is relatively simple in construction and economical to manufacture.

Another object of the present invention is to provide an element for a tape reel case which can be used to form both sides of the case.

In accordance with an aspect of the present invention the tape reel case comprises a pair of substantially identical annular and superimposed bezel rings and a pair of spaced side reel plates. In a presently preferred embodiment, the bezel rings each comprise an annular wall having first and second edge portions and an inwardly directed annular flange on the first edge portion of the annular peripheral wall. The peripheral wall of the bezel also has a tape dispensing opening or slot formed therein extending downwardly from the second edge portion thereof towards the first edge portion. The circular second edge portion of the peripheral wall also has a groove formed therein extending from a first end portion adjacent one side of the opening through a substantially semicircular arc to a second end portion substantially diametrically opposed to the opening in the peripheral wall. In addition, the second end portion of the peripheral wall has an upstanding bead formed thereon extending from a first end portion adjacent the opposite side of the tape opening from the first end portion of the groove through a substantially semicircular arc to a second end portion substantially diametrically opposed to the tape opening, adjacent to but spaced slightly from the second end portion of the groove.

A plurality of spaced fingers project upwardly from the flange of the bezel to positions above the second end portion of the wall whereby when one bezel is superimposed on the other, the fingers interdigitate and the groove of one bezel receives the bead of the other.

One of the side reel plates is respectively associated with each of the bezels and rests on its associated bezel flange so as to be captured between the flange and the fingers of the other bezel when the bezels are superimposed; thereby to define an internal chamber adapted to contain a spool or reel of tape.

The above, and other objects, features and advantages of this invention, will be apparent in the following detailed description of an illustrative embodiment thereof which is to be read in connection with the accompanying drawings, wherein:

FIG. 1 is a perspective view of a tape reel case constructed in accordance with the present invention;

FIG. 2 is an enlarged exploded perspective view illustrating the components forming the tape reel case of the invention;

FIG. 3 is a plan view of a tape reel case bezel constructed in accordance with the present invention having received therein one of the metal side reel plates;

FIG. 4 is a sectional view taken along line 4—4 of FIG. 3, but with the side reel plate removed;

FIG. 5 is an enlarged side sectional view showing the cooperation between the bead and groove of the superimposed bezels;

FIG. 6 is a side sectional view showing the support of a side reel plate in the assembled reel case;

FIG. 7 is a side sectional view, similar to FIG. 6 of another embodiment of the present invention;

FIG. 8 is an exploded side sectional view of the embodiment of FIG. 7 before the bezels are assembled; and FIG. 9 is a partial plan view, similar to FIG. 3 of the embodiment of FIGS. 7 and 8.

Referring now to the drawing in detail, and initially to FIG. 1 thereof, it is seen that a tape reel case 10 constructed in accordance with the present invention includes a pair of identically formed bezel members 12 which are secured in superimposed relation to each other to define an enclosed space in which a hub 14 having a supply of tape 15 wound thereon can be rotatably mounted. The tape is preferably of the measuring rule type, formed of cloth or steel strip material and extends through a slot 16 in the periphery of the casing. The hub 14 includes a handle 17 mounted thereon in any convenient manner, to permit the hub to be manually rotated in order to dispense or retract tape to or from the container.

Bezel members 12 are of identical construction, and are illustrated most clearly in FIGS. 2 and 3. Each bezel has a peripheral wall 20 which, in the preferred embodiment of the invention, is anularly shaped. The wall has a first edge or end portion 22 which includes an integral inwardly extending annular flange 24 that defines a support surface 25 on the inside of the wall 20.

The opposite edge or side 26 of wall 20 has a slot 28 formed therein which extends downwardly towards the edge 22 of the wall, and has a predetermined arcuate length. The slots 28 in the two bezel elements, when the bezels are assembled in superimposed relation, define the tape dispensing slot 16 of the completed tape case.

Bezel 12 also includes a groove or recess 30 formed along the edge 26 of peripheral wall 20. This groove extends from a first end portion 32 adjacent one end of slot 28 to a second end portion 34 through a substantially semicircular arc length, to a position which is approximately diametrically opposed from the opening 28. This groove may be recessed to the end 26 of wall 20, as illustrated in FIG. 5, or can be formed simply as a step in the edge 26, as seen in FIGS. 4 and 6.

In addition bezel 12 includes a bead 36 formed thereon which is substantially complementary to groove 30. The bead is formed on the edge 26 of annular side wall 20, has a first end portion 38 located adjacent the side of slot 28 which is opposite to the end portion 32 of groove 30. The bead extends through a semicircular arc length (which is substantially equal to the arc length of groove 30) to a second end portion 40 which is adjacent to but spaced from the end 34 of groove 30 and thus is also substantially diametrically opposed to the slot 28.

As seen in FIG. 2, the edge 26 of wall 20, between the ends 34, 40 of the groove end bead, is provided with a stud or pin 42, extending outwardly from edge 26, and a complementary recess or bore 44. The pin and bore serve as guide members when the bezels are superimposed with one another.

By this construction it will be appreciated that when the two bezels 12 are superimposed, so that their edges 26 engage one another, the bead 36 of one of the bezels will be received in the groove 30 of the other of the bezels while the pin 42 of one bezel will be inserted in the bore 44 of the other bezel. Thus the bezels are properly aligned, and they can be sonically welded to one another by applying sonic vibrations along the bezel in any convenient manner. In this connection the bead 36 acts as a sonic energy concentrator, to insure proper welding of the bezels together along the bead and groove.

According to the illustrative embodiment of the invention the side walls of tape reel case 10 are formed by a pair of substantially identical side plates 50, 52, illustrated in FIG. 2. These side plates are circular in plan and have a plurality of identically arranged radially extending teeth or fingers 54 formed thereon. The side plate 50 has an enlarged opening 56 formed therein to receive the hub 14 on which tape 15 is mounted, and to allow the hub to extend through the side wall whereby its handle 17 can be manually operated. Plate 52 on the other hand has a smaller opening 58 formed therein, through which a bolt or rivet 60 can be inserted into the hub 14. Hub 14 is rotatably mounted on the bolt 60, in any convenient manner, and the specific mounting arrangement used for the hub forms no part of the present invention.

As mentioned teeth 54 on each of the plates 50, 52 are identically spaced, as illustrated in the drawing, and the plates are respectively associated with each of the bezels 12. These bezels additionally include fingers 60 spaced along the inner surface of the peripheral wall 20 and projecting upwardly from flange 25 to positions above the edge 26 of the peripheral wall. The fingers 60 are located in identical positions on each bezel, and they are related to one another so that in the superimposed relationship of the two identical bezels the fingers will interdigitate.

In addition, fingers 60 are formed so that their height above the edge 26 of the peripheral wall is substantially equal to the height of the wall 20 above the flange 24 less the thickness of the side plate. In this manner, when the side plates are placed in their associated bezels, on flanges 24, with fingers 54 thereof positioned between fingers 60 of its associated bezel, and the bezels are superimposed, the free ends 62 of the fingers on one bezel will engage the surface 64 of the side plate associated with the other bezel to hold that side plate against the surface 25 of flange 24, as illustrated in FIG. 6, thereby keeping the side plates 50, 52 spaced from one another. In addition, the interdigitation of the fingers 54 with the fingers 60 in each bezel, and the relationship to one another, holds the plates against rotation by the engagement of the fingers 54 against the edges or sides of the fingers 60. The tight clamping engagement of the ends 62 of the fingers 60 against the side surfaces 64 of the plates 52, 54, also hold the side plates against rotation after the bezels are sonically welded together along the groove and bead structure 30, 36.

By this arrangement, a relatively simply constructed tape reel case is provided which utilizes identical bezel elements. Thus only one mold is necessary to produce all of the bezels necessary to manufacture a completed tape case. These bezels cooperate with the side plates 50, 52 to form a simple outer periphery and enclosure for the case protecting the enclosed tape; and they serve to trap the metal discs to form the front and back sides of the plate, and hold them against rotation. In addition, although the illustrative embodiment of the invention shows a presently preferred circular configuration for the bezel rings and side plates, it is contemplated that these elements can be provided in other shapes, such as oval, rectangular or square, with the bezels being formed in the same manner as previously described, in identical pairs.

In another embodiment of the invention, illustrated in FIGS. 7-9, side plates 50, 52 have smooth peripheral edges with no serrations formed thereon. In this form the inner face 80 of the bezels are provided with a tapered or champered wall portion 82 between its fingers 60, with the base of the champer, adjacent the support surface 25 of the bezel having the same wall thickness as the bezel wall thickness at the base 86 of the fingers. And, the side plates 64 have a diameter substantially equal to the internal diameter of the bezel wall adjacent support surface 25. Thus when the bezels are superimposed and pressed together the fingers 60 are forced inwardly (FIG. 7) to provide support for the plates 50, 52. To aid in the bending of the fingers their free ends 62a may also be champered to cooperate with champer surfaces 82.

Although an illustrative embodiment of the present invention has been described herein with reference to the accompanying drawings, it is to be understood that this invention is not limited to that precise embodiment thereof, but that various changes and modifications may be effected therein by one skilled in the art without departing from the scope or spirit of this invention.

What is claimed is:

1. A tape reel case comprising a pair of substantially identical annular superimposed bezel rings and a pair of spaced side reel plates, said bezel rings each comprising an annular peripheral wall having first and second edge portions and an inwardly directed annular flange on said first edge portion; said wall having a tape dispensing opening formed therein extending downwardly from said second edge portion thereof; said second edge portion of the wall having a groove formed therein extending from a first end portion adjacent one side of said opening through a substantially semi-circular arc to a second end portion substantially diametrically opposed to said opening and an upstanding bead formed thereon extending from a first end portion adjacent the opposite side of said opening from the first end portion of said groove through a substantially semi-circular arc to a second end portion substantially diametrically opposed to said opening adjacent to but spaced slightly from said second end portion of the groove; and a plurality of spaced fingers projecting upwardly from said flange to positions above the second edge of the wall whereby when one bezel is superimposed on the other the fingers thereof interdigitate and the groove of one receives the bead of the other, one of said plates being respectively associated with each of said bezels and resting on the flange thereof thereby to be captured between the flange and fingers of the other bezel.

2. A tape reel case as defined in claim 1 wherein said plates each have radial fingers extending between the fingers of its associated flange.

3. A tape reel case as defined in claim 2 wherein each of said bezels has an upstanding pin and a complementary adjacent recess formed in said second wall between the spaced second end portions of said groove and bead.

4. A tape reel case as defined in claim 1 wherein said bezels each have an internal wall surface extending generally perpendicularly from its flange with the portions of said wall between said fingers being champered from a thickness adjacent the flange which is substantially equal to the thickness of the bezel at the fingers to a narrower thickness inwardly of and remote from the flange whereby when the bezels are assembled the fingers are bent inwardly of the bezel to support the side reel plates on their free edges against said flange.

5. A tape reel case comprising a pair of substantially identical case elements each of which comprises a peripheral wall having first and second edge portions and an inwardly extending wall portion integral with said second edge portion; said first edge portion of said peripheral wall having a tape discharge slot formed therein extending from the first edge portion toward the second edge portion thereof and having a predetermined length; said first edge portion of said wall having a groove formed therein extending from a first end portion adjacent one end of said slot through approximately one half of the peripheral length of said wall to a second end portion approximately diametrically opposite said slot and a bead extending from a first end portion adjacent the opposite end of said slot from the first end portion of said groove through approximately one half of the peripheral length of said wall to a second end portion approximately diametrically opposite said slot, adjacent to but slightly spaced from the second end portion of the groove whereby the groove and bead of said case elements mate with each other when the case elements are placed in superimposed relation to each other with said first edge portion of said walls in alignment with each other; said case elements each including a plurality of identically located peripherally spaced fingers extending from said inwardly extending wall portion parallel to said peripheral wall portion to free ends located above said first edge portion of the wall whereby said fingers on said case elements interdigitate when the elements are superimposed with said first edge portions in engagement.

6. A tape reel case as defined in claim 5 wherein said first edge portion of said wall between the second end portion of said groove and bead includes an upstanding guide pin and a complementary adjacent guide pocket.

7. A tape reel case as defined in claim 6 wherein said peripheral wall is circular in plan and said groove and bead are substantially semicircular in configuration and have substantially the same length.

8. A tape reel case as defined in claim 7 wherein said inwardly extending wall portion comprises an annular flange.

9. A tape reel case as defined in claim 8 including a pair of substantially identical circular side plates respectively supported on said annular flanges, said plates having radial fingers extending between the fingers of its associated case element and the fingers of the case elements being dimensioned to capture said plates between said flanges and the free ends of said case element fingers.

10. A tape reel case as defined in claim 6 wherein said peripheral wall is polygonal in plan.

11. A tape reel case as defined in claim 6 wherein said peripheral wall is oval in plan.

12. A tape reel case comprising a pair of substantially identical case elements each of which comprises a peripheral wall having first and second edge portions and an inwardly extending wall portion integral with said second edge portion; said first edge portion of said peripheral wall having a tape discharge slot formed therein extending from the first edge portion toward the second edge portion thereof and having a predetermined length; said case elements each including a plurality of identically located peripherally spaced fingers extending from said inwardly extending wall portion parallel to said peripheral wall portion to free ends located above said first edge portion of the wall whereby said fingers on said case elements interdigitate when the elements are superimposed with said first edge portions in engagement.

13. The tape reel case as defined in claim 12 wherein said peripheral wall is circular.

14. A tape reel case as defined in claim 13 wherein said inwardly extending wall portion comprises an annular flange.

15. A tape reel case as defined in claim 14 including a pair of substantially identical circular side plates respectively supported on said annular flanges, said plates having radial fingers extending between the fingers of its associated case element and the fingers of the case elements being dimensioned to capture said plates between said flanges and the free ends of said case element fingers.

16. A tape reel case as defined in claim 12 wherein said bezels each have an internal wall surface extending generally perpendicularly from its inwardly extending wall portion with the portions of said wall between said fingers being champered from a thickness adjacent the inwardly extending wall portion which is substantially equal to the thickness of the bezel at the fingers to a narrower thickness inwardly of and remote from the inwardly extending wall portion whereby when the bezels are assembled the fingers are bent inwardly of the bezel to support the side reel plates on their free edges against said inwardly extending wall portion.

17. A tape reel case element comprising a peripheral wall having first and second edge portions and an inwardly extending wall portion integral with said second edge portion, said first edge portion of said peripheral wall having a tape discharge slot formed therein extending from the first edge portion thereof and having a predetermined length; said first edge portion of said wall having a groove formed therein extending from a first end portion adjacent one end of said slot through approximately one half of the peripheral length of said wall to a second end portion approximately diametrically opposite said slot and a bead extending from a first end portion adjacent the opposite end of said slot from the first end portion of said groove through approximately one half of the peripheral length of said wall to a second end portion approximately diametrically opposite said slot, adjacent to but slightly spaced from the second end portion of the groove; said first edge portion of said wall between the second end portion of the groove and bead including an upstanding guide pin and a complementary adjacent guide pocket; said peripheral wall being circular in plan and said groove and bead being substantially semi-circular in configuration and having substantially the same length; and a plurality of identically located peripherally spaced fingers extending from said inwardly extending wall portion parallel to said peripheral wall portion to free ends located above said first edge portion of the wall.

18. A tape reel case element as defined in claim 17 wherein said inwardly extending wall portion comprises an annular flange.

* * * * *